US012705989B2

(12) United States Patent
Liu et al.

(10) Patent No.: US 12,705,989 B2
(45) Date of Patent: Aug. 11, 2026

(54) SYSTEM AND METHOD FOR AUTONOMOUS TAXIING

(71) Applicant: Honeywell International Inc., Charlotte, NC (US)

(72) Inventors: Yufeng Liu, Beijing (CN); Le Shi, Beijing (CN)

(73) Assignee: Honeywell International Inc., Charlotte, NC (US)

( * ) Notice: Subject to any disclaimer, the term of this patent is extended or adjusted under 35 U.S.C. 154(b) by 119 days.

(21) Appl. No.: 18/659,732

(22) Filed: May 9, 2024

(65) Prior Publication Data

US 2025/0349218 A1 Nov. 13, 2025

(51) Int. Cl.

*G08G 5/51* (2025.01)
*G06F 40/30* (2020.01)
*G06V 10/70* (2022.01)
*G06V 20/56* (2022.01)

(Continued)

(52) U.S. Cl.

CPC ............... *G08G 5/51* (2025.01); *G06F 40/30* (2020.01); *G06V 10/70* (2022.01); *G06V 20/56* (2022.01); *G08G 5/26* (2025.01); *G08G 5/80* (2025.01)

(58) Field of Classification Search

CPC ... G08G 5/51; G08G 5/26; G08G 5/80; G06F 40/30; G06V 10/70; G06V 20/56

See application file for complete search history.

(56) References Cited

U.S. PATENT DOCUMENTS 9,852,645 B2 12/2017 Wright
11,094,210 B2 8/2021 Pesik
11,475,779 B2 10/2022 Erignac (Continued)

FOREIGN PATENT DOCUMENTS

EP 4102486 A2 * 12/2022 ............... G06T 7/73

OTHER PUBLICATIONS

European Patent Office, "Partial European Search Report", dated Oct. 13, 2025, from EP Application No. 25173145.1, from Foreign Counterpart to U.S. Appl. No. 18/659,732, pp. 1 through 18, Published: EP.

(Continued)

*Primary Examiner* — Mary Cheung
(74) *Attorney, Agent, or Firm* — Fogg & Powers LLC

(57) ABSTRACT

A system comprises a controller onboard a vehicle that provides for autonomous taxiing of the vehicle at an airport. Onboard optical sensors include look-forward and look-down optical sensors. An onboard bidirectional radio receives ATC clearance information. The system also includes onboard aiding sensors, and an airport moving map database. An ATC clearance processing module translates the ATC clearance information into processor readable information. An image processing module receives image data from the optical sensors, and provides object detection and image interpretation functions. A taxi route generation module receives translated ATC clearance information and map information to generate a travel route at the airport for the vehicle. An aiding sensor data processing module determines state information for the vehicle based on vehicle state data. A command generation module generates commands for driving the vehicle. A control module automatically drives the vehicle on an airport surface, and controls a brake and throttle.

20 Claims, 9 Drawing Sheets

(51) Int. Cl.

| | |
|---|---|
| ***G08G 5/26*** | (2025.01) |
| ***G08G 5/80*** | (2025.01) |

(56) References Cited

U.S. PATENT DOCUMENTS

| | | | | |
|---|---|---|---|---|
| 11,908,336 | B2 * | 2/2024 | Erignac | G08G 5/74 |
| 2004/0059497 | A1 | 3/2004 | Sankrithi | |
| 2013/0240665 | A1 * | 9/2013 | Cox | B64C 25/405 244/50 |
| 2014/0297168 | A1 | 10/2014 | Ovens et al. | |
| 2015/0142214 | A1 * | 5/2015 | Cox | G05D 1/0083 701/3 |
| 2016/0171899 | A1 | 6/2016 | Depare et al. | |
| 2017/0032687 | A1 * | 2/2017 | Lamkin | G08G 5/727 |
| 2017/0053536 | A1 * | 2/2017 | Wright | G08G 5/50 |
| 2021/0104164 | A1 * | 4/2021 | Erignac | G08G 5/51 |
| 2021/0134167 | A1 | 5/2021 | Erignac | |
| 2022/0343897 | A1 * | 10/2022 | Agarwal | G08G 5/26 |
| 2023/0076554 | A1 * | 3/2023 | Shyman | G08G 5/22 |
| 2023/0215431 | A1 * | 7/2023 | Baladhandapani | G08G 5/26 |
| 2024/0331552 | A1 * | 10/2024 | Watson | G06Q 50/40 |

OTHER PUBLICATIONS

European Patent Office, “Extended European Search Report”, dated Jan. 9, 2026, from EP Application No. 25173145.1, from Foreign Counterpart to U.S. Appl. No. 18/659,732, pp. 1 through 16, Published: EP.

* cited by examiner

900

912

AI: "A320 taxing on taxiway N from left to right"

"UAS 1, Follow A320 right turn on Taxiway November"

920

N ->

910

SYSTEM AND METHOD FOR AUTONOMOUS TAXIING

BACKGROUND

The taxi operation of vehicles in airport environments is very complex due to several factors. One factor is that traffic is becoming increasingly congested in various airports; another factor is that some airports are designed in complex ways, such as with multiple runways, multiple terminals, and many taxiways that are inter-connected with each other. Conditional clearances are an important tool for air traffic control (ATC) to manage the flow of traffic and maintain safety both in the air and on the ground.

An ATC conditional clearance is a clearance message issued by air traffic control that is subject to certain conditions. This type of clearance is issued to pilots in order to provide additional instructions or restrictions that must be met before an aircraft can proceed as authorized. This situation can make a pilot's workload very high during the taxiing phase of the aircraft. When uncrewed aircraft such as used in an unmanned aircraft system (UAS) taxi on the surface of airports that are shared with crewed aircraft, a remote pilot of the UAS may have difficulty in executing an ATC conditional clearance due to lack of situational awareness.

Accordingly, there is a need for enhanced systems that provide for autonomous taxiing of uncrewed aircraft at airports shared with crewed aircraft.

SUMMARY

A system comprises at least one controller onboard a vehicle and configured to provide for autonomous taxiing of the vehicle at an airport, the at least one controller including a processor and a memory in operative communication with the processor. A set of optical sensors onboard the vehicle are in operative communication with the processor, the optical sensors including at least one look-forward optical sensor and at least one look-down optical sensor. At least one bidirectional communication radio onboard the vehicle is in operative communication with the processor, the at least one bidirectional communication radio operative to receive ATC clearance information. One or more aiding sensors onboard the vehicle are in operative communication with the processor, and an airport moving map database is located in the memory.

The processor hosts a plurality of data processing and control modules, including an ATC clearance processing module operative to receive the ATC clearance information from the at least one bidirectional communication radio, the ATC clearance processing module operative to translate the ATC clearance information into processor readable information. An image processing module is in operative communication with the ATC clearance processing module and operative to receive image data from the optical sensors, the image processing module configured to provide an object detection function and an image interpretation function. A taxi route generation module is in operative communication with the ATC clearance processing module and the airport moving map database, the taxi route generation module operative to receive the translated ATC clearance information from the ATC clearance processing module, and to receive map information from the airport moving map database, to thereby generate a geographic travel route at the airport for the vehicle. An aiding sensor data processing module is operative to receive vehicle state data from the one or more aiding sensors, the aiding sensor data processing module operative to determine state information for the vehicle based on the vehicle state data. A command generation module is in operative communication with the image processing module, the taxi route generation module, and the aiding sensor data processing module, the command generation module configured to generate commands for driving the vehicle. A control module is in operative communication with the command generation module, the control module operative to automatically drive the vehicle on a surface of the airport, and to control a brake and throttle of the vehicle to adjust a speed of the vehicle.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for autonomous taxiing of vehicles at airports is described herein. The present system and method are applicable to various types of vehicles, such as crewed aircraft, uncrewed aircraft, or ground vehicles that operate on airport surfaces.

The present approach provides a solution to the difficulties of taxiing uncrewed aircraft or ground vehicles by using methods supported by artificial intelligent (AI) techniques, to understand air traffic control (ATC) clearance messages and then integrate this with an understanding of an airport surface environment image to mimic human behavior. This approach enhances the autonomous capability of uncrewed aircraft or ground vehicles to operate on complex airport scenario surfaces.

The present techniques provide a low cost solution to enable autonomous taxiing, especially for unmanned aircraft system (UAS) operations, which can be incorporated into existing air traffic management operations. In addition, the present techniques can use existing onboard aircraft sensors.

Further details of various embodiments are described hereafter and with reference to the drawings.

Figure 1:
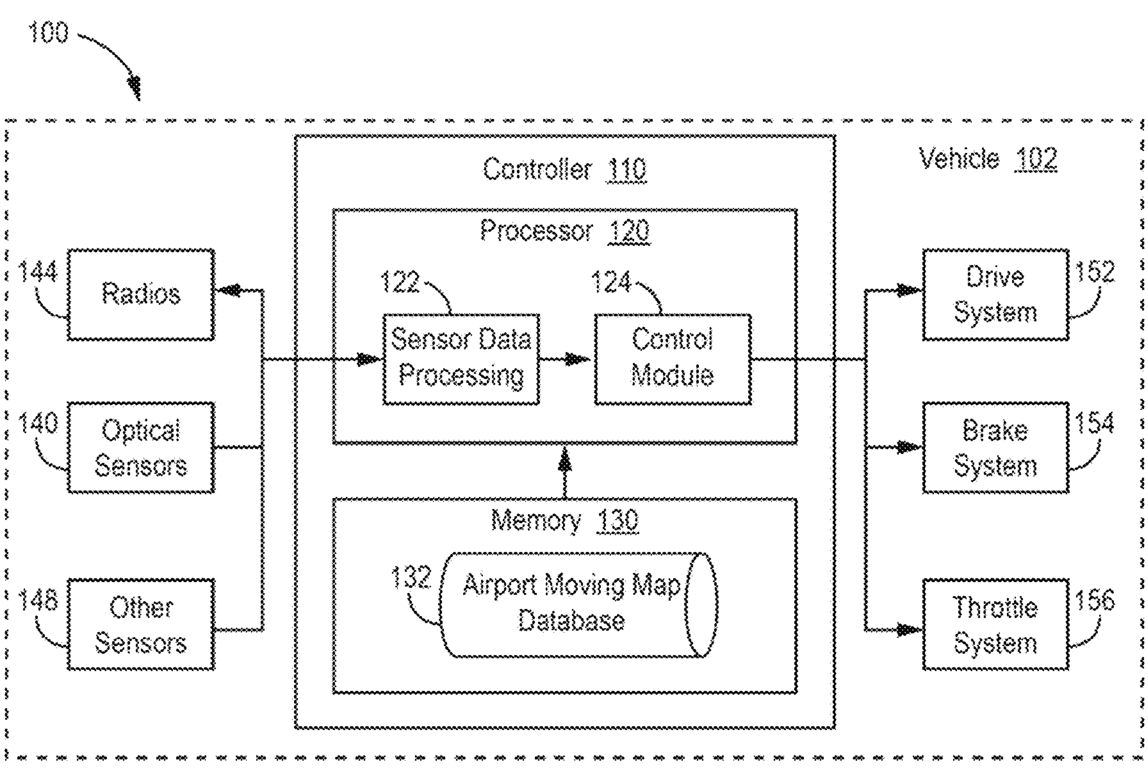
FIG. 1 is a block diagram of a system for autonomous taxiing of a vehicle, according to one embodiment.

FIG. 1 is a block diagram of a system 100 for autonomous taxiing of a vehicle 102, according to one embodiment. The system 100 comprises at least one controller 110 onboard vehicle 102 that is configured to provide for autonomous taxiing of vehicle 102 at an airport. The controller 110 includes a processor 120, and a memory unit 130 in operative communication with processor 120. The processor 120 hosts several software modules operative to provide sensors data processing at 122, and also hosts a control module 124. An airport moving map database 132 is stored in memory unit 130. The vehicle 102 can be an aircraft, either crewed or uncrewed (e.g., UAS), or can be a ground vehicle that operates on a surface of the airport.

A set of optical sensors 140 onboard vehicle 102 are in operative communication with processor 120. The optical sensors 140 are operative to capture images of the airport environment, and provide corresponding image data to processor 120 for use in the sensors data processing at 122. As described further hereafter, optical sensors 140 include at least one look-forward optical sensor and at least one look-down optical sensor. The optical sensors 140 can be visual light cameras, infrared cameras, or the like, which can be controlled to adjust a tilt angle.

One or more radios 144, such as a bidirectional communication radio, is onboard vehicle 102 and operative to receive ATC clearance information. The radios 144 are in operative communication with processor 120 and are operative to provide the ATC clearance information as input data for the sensors data processing at 122. The radios 144 can include a very high frequency (VHF) radio, a high frequency (HF) radio, a satellite communications (SATCOM) unit, or a radio using other terrestrial technology such as 4G or 5G. The radios 144 can transmit response messages, generated by vehicle 102, back to an ATC center.

One or more other sensors 148, such as aiding sensors, are onboard vehicle 102 and are in operative communication with processor 120. The other sensors 148 are operative to provide vehicle data as input data for the sensors data processing at 122. For example, the other sensors 148 are operative to measure position, speed, heading, or other parameters for vehicle 102. The sensors can include, but are not limited to, Global Navigation Satellite System (GNSS) sensors such as Global Positioning System (GPS) sensors, an Inertial Reference System (IRS), an Attitude Heading Reference System (AHRS), a magnetic heading device, or the like.

The control module 124 in processor 120 is in operative communication with a drive system 152, a brake system 154, and a throttle system 156 of vehicle 102. Based on the processing results from the sensors data processing at 122, control module 124 is configured to automatically drive vehicle 102 on an airport surface through drive system 152, and can control brake system 154 and throttle system 156 to adjust the speed of vehicle 102.

Figure 2:
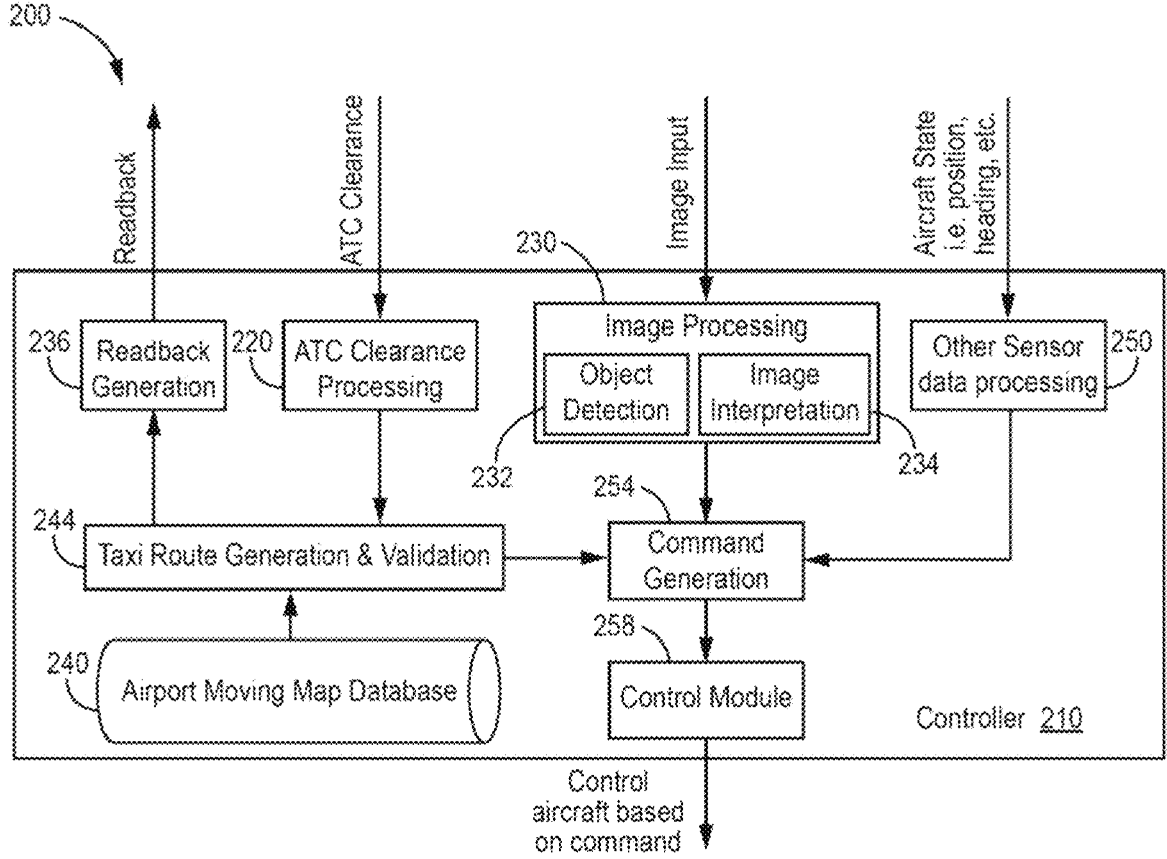
FIG. 2 is a block diagram of an exemplary software architecture for use in the system of FIG. 1.

FIG. 2 is a block diagram of an exemplary software architecture 200 for use in a system for autonomous taxiing of a vehicle at an airport, such as system 100 of FIG. 1. The software architecture 200 generally comprises a controller 210, which includes one or more processors that host various data processing, generation, and control modules, which are described as follows.

An ATC clearance processing module 220 is operative to receive ATC clearance information, such as from a bidirectional communication radio onboard a vehicle such as an aircraft. The ATC clearance processing module 220 is operative to translate the ATC clearance information into processor readable information. For example, ATC clearance processing module 220 can translate taxi clearance information into some computer understandable information, which can include airport elements such as taxiway, runway, and/or some conditions that must be met before the aircraft can proceed as authorized.

An image processing module 230 is in operative communication with ATC clearance processing module 222, and is operative to receive image input data from optical sensors onboard the aircraft. The image processing module 230 is configured to provide an object detection function at 232, and an image interpretation function at 234. The image processing module 230 can include software algorithms in the object detection function at 232 and the image interpretation function at 234, to process images from a look-forward camera and a look-down camera on the aircraft for object detection and interpretation. For example, these software algorithms can interpret a look-forward image to determine if a condition contained in a conditional clearance is met before the aircraft can proceed as authorized. In addition, the software algorithms can process a look-down image to determine if there is a deviation of the aircraft with respect to a guidance line and/or other reference on the taxiway or runway. While the aircraft is taxiing on a surface of the airport, the software algorithms can calculate a distance from a proceeding aircraft based on the look-forward image to keep a safe separation.

The controller 210 also includes an airport moving map database 240 stored in a memory unit. The airport moving map database 240 contains map information for an airport element, such as coordination information for each airport element and connecting information between different airport elements, including locations where there is an intersection between one taxiway and another taxiway, for example.

A taxi route generation and validation module 244 is in operative communication with ATC clearance processing module 220 and airport moving map database 240. The taxi route generation and validation module 244 is operative to receive the translated ATC clearance information from ATC clearance processing module 220, and to receive aircraft state information, and to receive map information from airport moving map database 240, to thereby generate a geographic travel route at the airport for the aircraft. For example, taxi route generation and validation module 244 takes the translated ATC clearance information as input, and leverages the map information from airport moving map database 240, to generate the geographic travel route for the aircraft.

Since airport moving map database 240 contains connecting information between different airport elements, this connecting information (or restrictions) can provide additional intelligence for taxi route generation and validation module 244 to use in validating whether the taxi clearance is correct or not. For example, if an ATC controller requests an aircraft to taxi from a taxiway A to a taxiway C, but there is no connecting information between taxiway A and taxiway C in airport moving map database 240, this indicates that the taxi clearance issued by the ATC controller is not correct, or that ATC clearance processing module 220 translated the taxi clearance incorrectly.

As further depicted in FIG. 2, other (aiding) sensor data processing module 250 is operative to receive aircraft state data from other sensors such as aiding sensors onboard the aircraft. Such aircraft state data can include position, speed, heading, and the like. The other sensor data processing module 250 is operative to determine state information for the aircraft based on the aircraft state data.

A command generation module 254 is in operative communication with image processing module 230, taxi route generation and validation module 244, and other sensor data processing module 250. The command generation module 254 is configured to generate commands for driving the aircraft. For example, command generation module 254 can generate commands for the aircraft to start, stop, turn left, turn right, speed up, slow down, and the like. Also, command generation module 254 can calculate a target of the command, such as how many angular degrees to turn.

A control module 258 is in operative communication with command generation module 254. The control module 258 is operative to control the aircraft based on the commands from command generation module 254. For example, the control module 258 can automatically drive the aircraft on a surface of the airport, and can control a brake and throttle of the aircraft to adjust a speed of the aircraft. The control module 258 can include auto-pilot, auto-brake and auto-throttle sub-systems to control the aircraft based on the commands generated by command generation module 254.

As further shown in FIG. 2, controller 210 can host a readback generation module 236 that is in operative communication with taxi route generation and validation module 244. The readback generation module 236 is operative to generate a response message for transmission to an ATC controller, indicating that the aircraft received and understood the ATC clearance information. The response message can be generated in either a voice or text format for transmission to the ATC controller.

Figure 3:
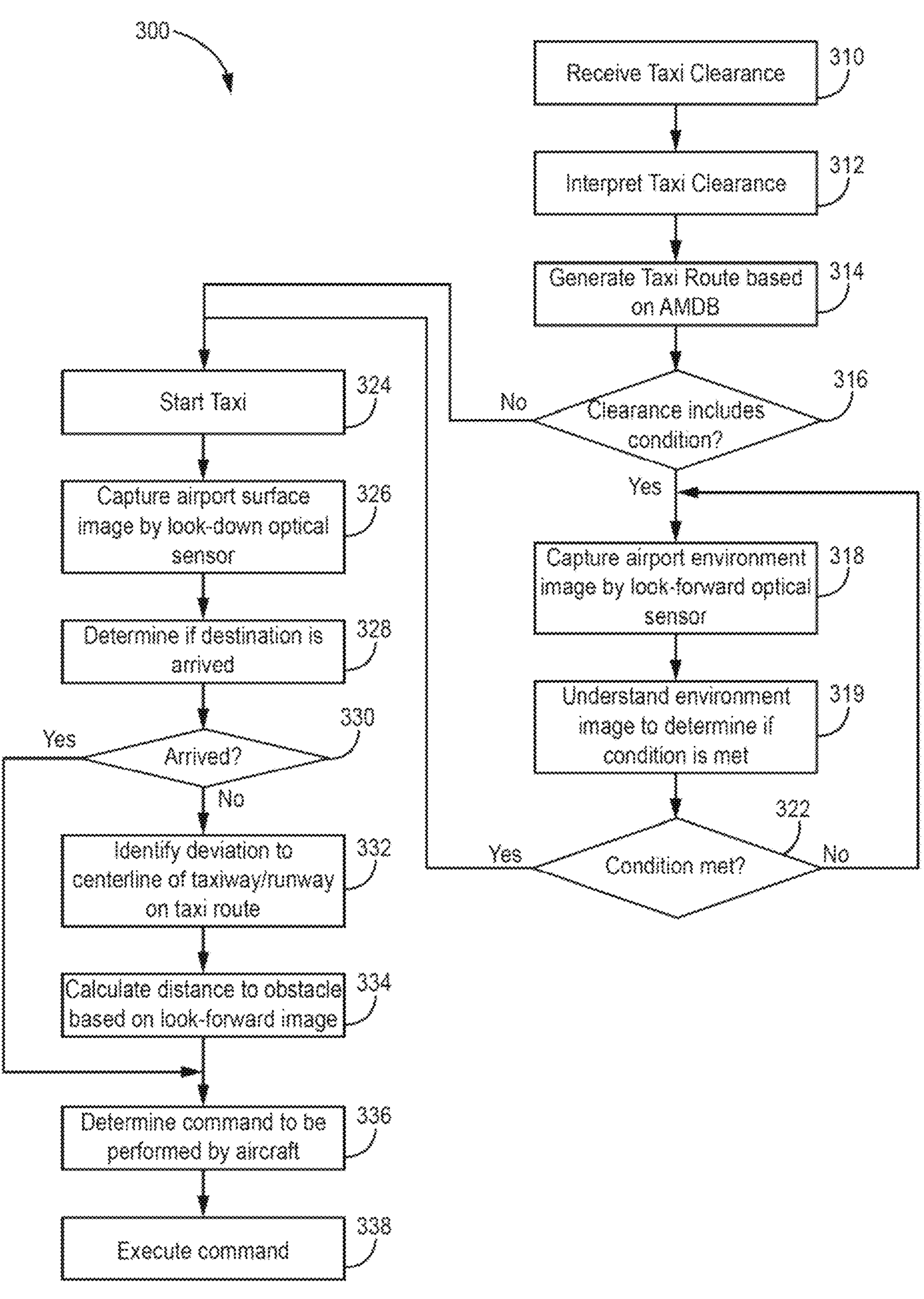
FIG. 3 is a flow diagram of a method for autonomous taxiing of a vehicle, according to one implementation.

FIG. 3 is a flow diagram of a method 300 for autonomous taxiing of a vehicle, such as an aircraft, according to one implementation, which can be executed by system 100 utilizing software architecture 200 as described above. Initially, method 300 receives a taxi clearance (block 310) from an ATC controller, in either voice format or text format. The method 300 interprets the taxi clearance (block 312), such as by using ATC clearance processing module 222, to interpret the semantics of the taxi clearance and extract airport element information, such as taxiway or runway information and any condition information contained therein. The method 300 then generates a taxi route based on an airport moving map database (AMDB) (block 314). For example, taxi route generation and validation module 244 can be used to generate a geographic taxi route for an aircraft based on the ATC clearance input and the airport moving map database.

Next, method 300 determines whether the taxi clearance includes a condition (block 316). If yes, method 300 captures an airport environment image by a look-forward optical sensor (block 318), and understands the environment image to aid in determining if the condition is met (block 319). If method 300 determines that the condition is not met at block 322, then method 300 repeats starting at block 318. If method 300 determines that the condition is met at block 322, then method 300 starts the taxi process (block 324). Returning to block 316, if method 300 determines that the taxi clearance does not include a condition, then method 300 starts the taxi process at block 324.

At this point, method 300 captures an airport surface image by a look-down optical sensor (block 326), and determines if a destination is arrived at based on the airport surface image (block 328). If method 300 determines that the aircraft has not arrived at the destination at block 330, then method 300 operates to identify a deviation to a centerline of a taxiway or runway on the taxi route (block 332). The method 300 then calculates the distance to any obstacle based on a look-forward image (block 334). The method 300 then determines a command to be performed by the aircraft (block 336). Returning to block 330, if method 300 determines that the aircraft has arrived at the destination, then method 300 proceeds directly to block 336. The method 300 then executes commands to be performed by the aircraft (block 338).

The method 300 can be used to drive an aircraft automatically to taxi on an airport surface by following an ATC clearance. Based on the image processing results, the commands can include, for example: turn right by some degrees, turn left by some degrees, or stop. The commands are generated and transmitted to a control module such as control module 258 to drive the aircraft.

Referring back to FIG. 2, in case the ATC clearance includes a condition, which must be met before the aircraft can proceed, ATC clearance processing module 220 extracts and transmits the condition to image processing module 230. For example, an ATC clearance can state: "UAS one two three, Follow Airbus 320, right turn on taxiway November, hold short of Runway Two-Seven Left." The ATC clearance processing module 220 can interpret the semantics of this ATC clearance as that there is an Airbus 320 aircraft taxiing on the taxiway November from left to right, and after the Airbus 320 passes the intersection, the own-ship aircraft (UAS one two three) can start to turn right on the taxiway November. Therefore, the condition "one Airbus 320 aircraft taxi on taxiway November from left to right and pass the intersection" can be extracted and transmitted to image processing module 230.

The image processing module 230 will firstly process the image captured by the look-forward camera to interpret the image content. When the semantics of the look-forward image matches up with the condition, command generation module 254 transmits a start command to control module 258 to start the taxi, meanwhile, image processing module 230 processes the image captured by the look-down camera to determine whether the destination is reached based on the image characteristics. If the destination is not reached yet, image processing module 230 continues to monitor and process the look-down image, to identify aircraft deviation to a centerline of the taxiway or runway on the taxi route based on image characteristics. The deviation to the centerline of taxiway or runway can be converted as a heading command to drive the aircraft, such as by turning right some degrees or turning left some degrees. Arriving at the destination can be converted as a full brake command to stop the aircraft.

In case the ATC clearance does not include a condition, command generation module 254 transmits a start taxi command to control module 258 to start driving the aircraft for moving forward. The image processing module 230 processes the look-down image to determine whether the destination is reached or not, and to identify any deviation to a centerline of the taxiway or runway on the taxi route. Based on the image processing result, the commands including turn right by some degrees, turn left by some degrees, or stop, are generated and transmitted to control module 258 to drive the aircraft.

During the taxi stage, image processing module 230 can also process look-forward images to calculate the distance to any obstacle in the moving direction, when the distance is less than a configurable separation threshold. For example, command generation module 254 can generate a slow-down command, which is transmitted to control module 258 to control a brake and/or throttle to reduce aircraft taxi speed.

Further details of various embodiments of the software modules used in the architecture of the present approach are described in the following sections.

ATC Clearance Processing

The ATC clearance processing module is operative to take an ATC controller's taxi clearance as input to understand taxi clearances. The ATC clearance processing module can receive the taxi clearance through several different ways from a ground ATC controller.

Figure 4:
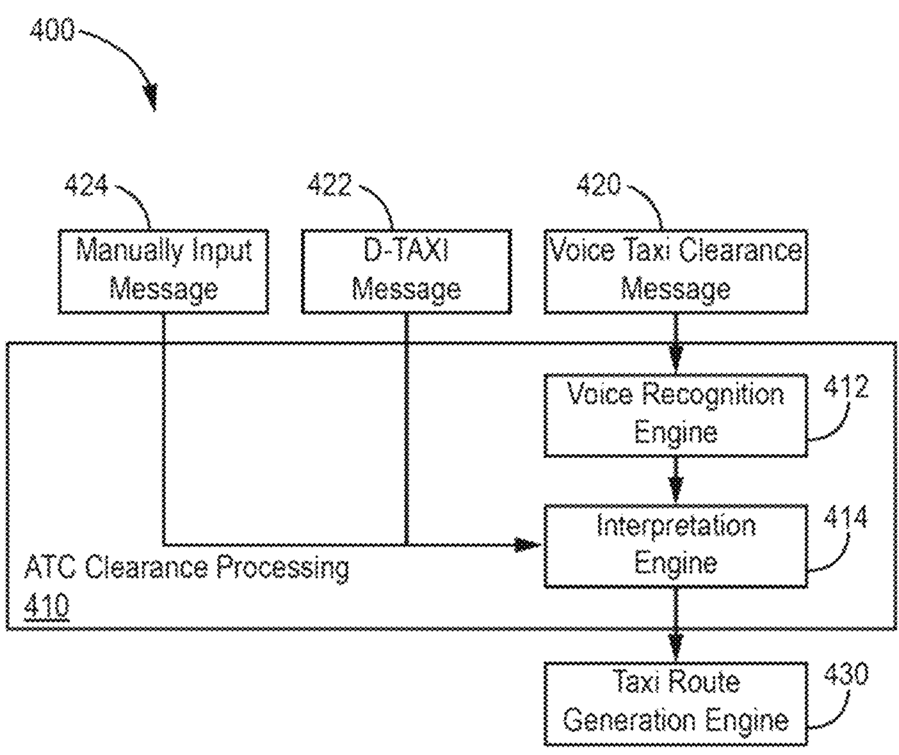
FIG. 4 is a block diagram of a taxi clearance process as performed by an ATC clearance processing module, according to one implementation.

FIG. 4 is a block diagram for a taxi clearance process 400 as performed by an ATC clearance processing module 410, according to one implementation. As shown, The ATC clearance processing module 410 is configured to host a voice recognition engine 412 and an interpretation engine 414 in operative communication with voice recognition engine 412. During operation, a voice taxi clearance message 420 can be received, via a voice channel of a communication radio, by voice recognition engine 412; a datalink taxi clearance (D-TAXI) message 422 can be received, through a datalink application, by interpretation engine 414; or a manually input taxi clearance message 424, input by a pilot via devices such as a multi-function control and display unit (MCDU) or a touch screen controller, can be received by interpretation engine 414. The ATC clearance processing module 410 is operative to output a result to a taxi route generation engine 430.

The voice recognition engine 412 is configured to transcript the taxi clearance message from voice into text, for example: "United Airline one two three, runway zero eight, taxi from Charlie eleven via taxiway Bravo and Bravo one". When the taxi clearance message is presented in a datalink message (D-TAXI), there is no need to use voice recognition engine 412, and the D-TAXI message can be directly transmitted to interpretation engine 414 for further processing.

The interpretation engine 414 is operative to take the transcript text as input to understand the semantics of the taxi clearance by reference to the International Civil Aviation Organization (ICAO) ATC clearance phraseology, and extract key information. The interpretation engine 414 can be an AI engine that employs AI processing methods including, but not limited to, natural language processing, regular expression, or the like, to understand the semantics and extract key information from the transcript text. In the above example, the key information includes: a starting point parking stand of Charlie eleven, taxiway bravo and bravo one; and the destination is runway zero eight. The "United Airline one two three" is the call sign for the own-ship aircraft, and based on the call sign, the processor of the interpretation engine 414 can know whether the taxi clearance is issued for the own-ship aircraft or not.

The interpretation engine 414 may also translate the key information into a predefined interface to taxi route generation engine 430 as shown below in Table 1-Taxi Route Interface. The translated taxi clearance elements can be transmitted to taxi route generation engine 430 in a list or an array as indicated in Table 1.

TABLE 1

Taxi Route Interface

| Element | Element Type | Element ID |
|---|---|---|
| Start point | Parking stand | C11 |
| Route segment | Taxiway | B |
| Route segment | Taxiway | B1 |
| . . . | . . . | . . . |
| Destination | Runway | 08 |

An AI method such as a natural language processing method can be trained by a large amount of real ATC clearance data to understand the semantics of taxi clearances, such as what is the taxi path element like taxiway or runway, what is a callsign of aircraft, and what is the condition to execute the taxi clearance. Since the ICAO standards specify many rules for ATC clearance phraseology, ATC controllers are trained to follow the ICAO standards to issue clearances to pilots. This improves the possibility to train the natural language processing method to understand the semantics of ATC clearances.

To make taxi operation safe and efficient, in some cases, an ATC controller may issue a taxi clearance including a condition, or the clearance is issued segmentally. For example, "UAS one two three, follow Airbus 320, right turn on taxiway November, hold short of Runway Two-Seven Left." The interpretation engine 414 can use an AI method such as a natural language processing algorithm to understand the semantics of the clearance. For this example, the semantics is that there is an Airbus 320 aircraft taxiing on the taxiway November from left to right, after the Airbus 320 passes the intersection, the own-ship aircraft can start to turn right on the taxiway November and continue taxi on taxiway November behind the Airbus 320 aircraft by maintaining safe distance, stop in front of hold short line before entering Runway 27L. The hold short line will be translated as a destination for this segment. The "one Airbus 320 aircraft taxi on taxiway November from left to right and pass the intersection" will be interpreted as a condition to start the clearance for the own-ship aircraft.

Taxi Route Generation and Validation

Figure 5:
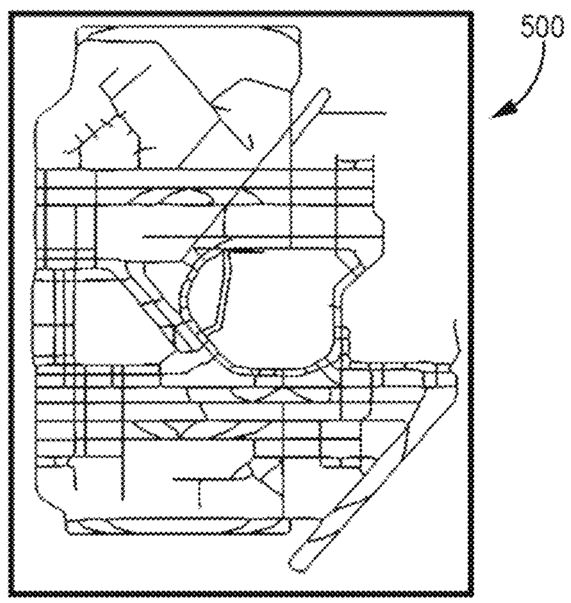
FIG. 5 is a schematic diagram of an example airport network, according to one embodiment.

The taxi route generation and validation module hosts a taxi route generation engine (such as taxi route generation engine 430), which receives the taxi clearance elements from an interpretation engine (such as interpretation engine 414) to generate a taxi route in two steps. The first step is to generate an airport network from the AMDB (airport moving map database). The airport network basically includes various edges and nodes. The edges contain the taxiway or runway segments, and the nodes are intersections between/among taxiways and/or runways. Each edge includes several attributes, including length, coordination, and type such as taxiway or runway, and identity like B1, etc., also associated to different nodes. Each node includes several attributes including coordinates. The different edges connect through nodes to reflect a horizontal topology relation among major elements (taxiways and/or runways) at the airport. FIG. 5 depicts an example of an airport network 500, according to one embodiment.

The taxi clearance elements from the interpretation engine are organized in sequence from a start point to a destination. In the second step, the taxi route generation engine finds the most associated network element (edge) for each taxi clearance element from the airport network generated from the first step, based on the aircraft position and clearance element ID, then connects each edge through nodes.

Figure 6:
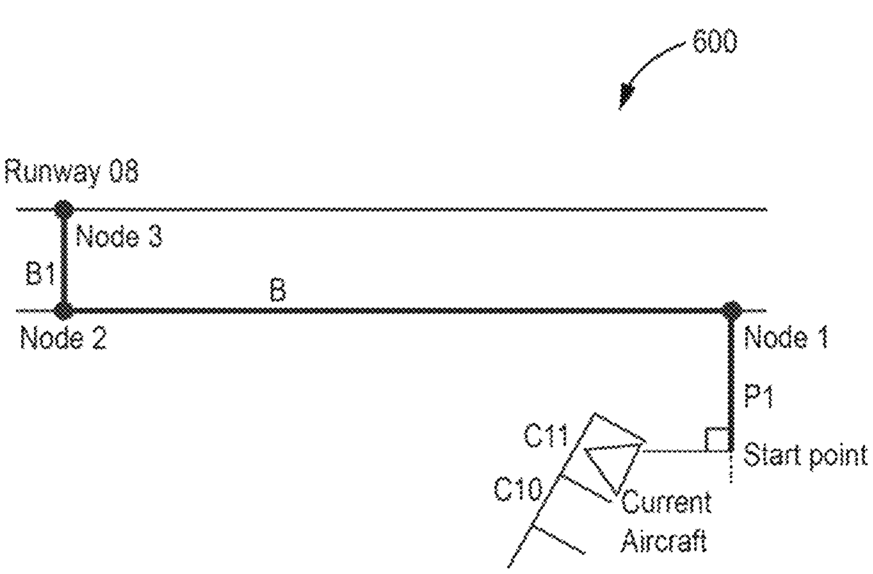
FIG. 6 is a schematic diagram of an example taxi route scenario for a taxi clearance.

Taking the taxi clearance "United Airline one two three, runway zero eight, taxi from Charlie eleven via taxiway Bravo and Bravo one" as an example, the start point is parking stand C11, route segments include B and B1, and the destination is runway 08. FIG. 6 shows an example of a taxi route scenario 600 corresponding to this taxi clearance. In this example, the taxi route generation engine finds the parking stand C11 from the airport network based on the current aircraft position. Since the taxi lane P1 is the only path connecting the parking stand area to taxiway B, the ATC controller may omit the P1 in the taxi clearance, but the taxi route generation engine will find P1 as the most associated network element. Since taxi lane P1 is the closest taxi lane to the current aircraft position, the taxi route generation engine will project the current aircraft position to the taxi lane P1 as the start point, as shown in FIG. 6. Based on the airport network, a Node 1 is the intersection between taxi lane P1 and taxiway B, a Node 2 is the intersection between the taxiway B and taxiway B1, and a Node 3 is connecting the taxiway B1 and runway 08. Therefore, the taxi route generation engine will generate a taxi route by connecting from the start point to taxiway B via Node 1, connecting to taxiway B1 via Node 2, and connecting to runway 08 via Node 3. The taxi route generated from the airport network contains geographic information that tells the aircraft where to connect to another taxiway or runway.

Figure 7:
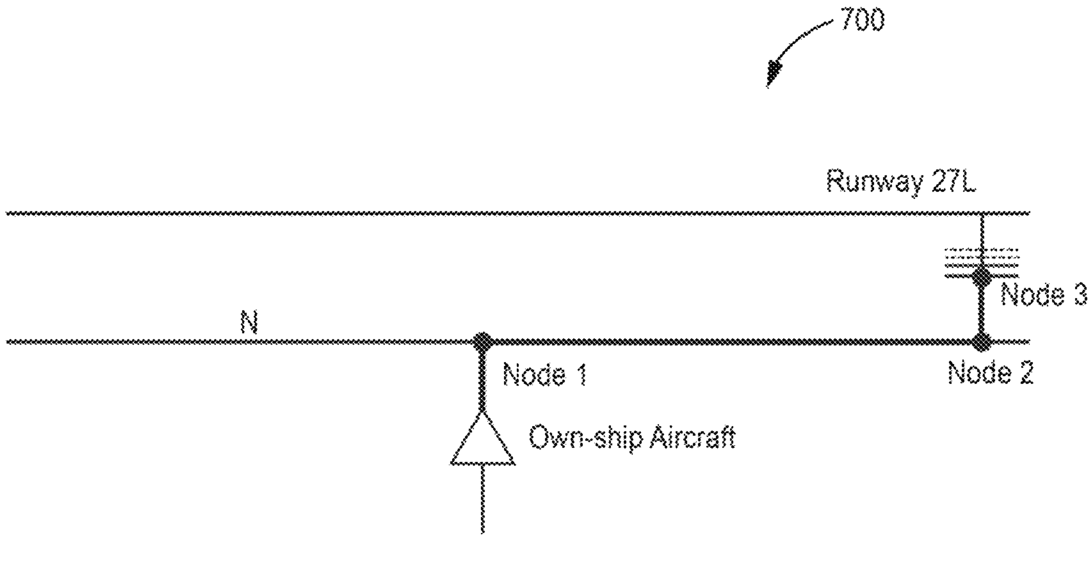
FIG. 7 is a schematic diagram of another example taxi route scenario for a taxi clearance.

Taking another taxi clearance "UAS one two three, follow Airbus 320, right turn on taxiway November, hold short of Runway Two-Seven Left" as a further example, the interpretation engine understands the semantics of the clearance and extracts the key information, with the start point being the current aircraft position, the taxi segment is taxiway November (N), and the destination is the hold short line in front of Runway 27L. FIG. 7 shows an example of a taxi route scenario 700 corresponding to this taxi clearance. The taxi route generation engine takes this key information as inputs to search the most associated elements in the aircraft network. The taxi route generation engine can know from the airport network that a Node 1 is the intersection between the current taxiway and taxiway November, that another taxiway connects taxiway November to Runway 27L via a Node 2, and that a hold short line at Node 3 is located on this inter-connecting taxiway. The taxi route generation engine can generate a taxi route by connecting the current own-ship aircraft position to the taxiway November via the Node 1, and connecting to the hold short line (Node 3) via the Node 2.

Since the airport network generated from the AMDB contains connecting information between different airport elements, such as where there is an intersection between one taxiway and another taxiway, such connecting information (or restrictions) brings up additional intelligence for the taxi route generation module to validate if the taxi clearance is correct or not. For example, if the ATC controller requests the aircraft to taxi from taxiway A to taxiway C, however, there is no connecting route between taxiway A and taxiway C in the airport network, then the taxi clearance issued by the ATC controller is not correct, or the ATC clearance processing module translated the clearance incorrectly.

Image Processing

The image processing module receives image input data input from at least two optical sensors such as cameras installed on the aircraft. One of the optical sensors can be a look-forward camera, and the other optical sensor can be a look-down camera. The look-forward camera can be installed and configured with two tilt angles to capture different ranges of field of view in the moving direction. One configuration for the look-forward camera can be for a far view with zero tilt angle for instance, and the other configuration for the look-forward camera can be for a near view with a tilt down angle.

Figures 8, 9:
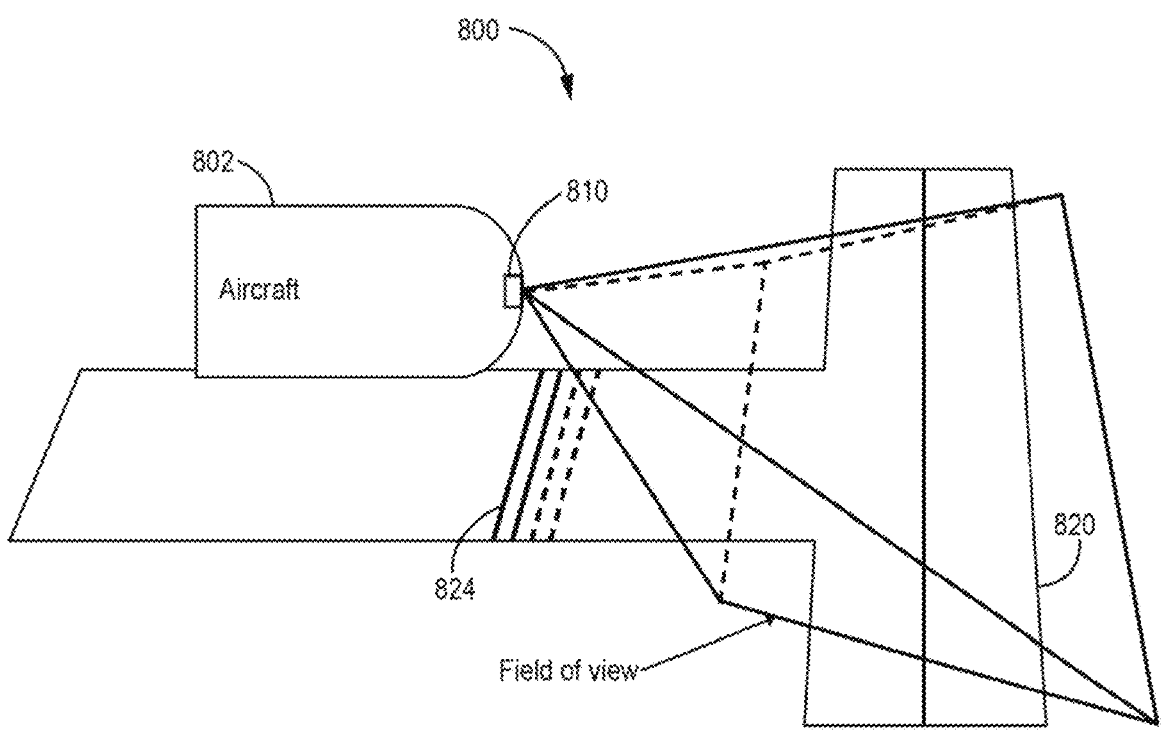
FIG. 8 is a schematic diagram of an example aircraft scenario for an aircraft with a look-forward camera at a tilt down angle.
FIG. 9 is a schematic diagram of an example conditional clearance scenario, in which a UAS is to hold in front of a taxiway.

FIG. 8 illustrates an example aircraft scenario 800 for an aircraft 802 with a look-forward camera 810 at a tilt down angle. The look-forward camera 810 can be installed to mainly focus on a nearest taxiway or runway 820 when an aircraft stops in front of a hold short line 824. This configuration can significantly eliminate information beyond the taxiway or runway 820 on the captured image. Since the distance from hold short line 824 to taxiway or runway 820 is defined as an industry standard, the tilt angle will depend on the camera installation position on the aircraft and aircraft type. The look-forward camera 810 can be installed and configured to capture the image of taxiway or runway 820 near aircraft 802 in the moving direction.

FIG. 9 illustrates an example of a conditional clearance scenario 900, in which a UAS one (910) is to hold in front of a taxiway November (N). The ATC controller issues a taxi clearance: "UAS one, follow A320 right turn on Taxiway November". The ATC clearance processing module uses a natural language processing method to understand the semantics of this clearance and decompose the semantics into a combination of several simple conditions as follows: one aircraft (912) is on taxiway November (N), the aircraft (912) is Airbus 320, and the Airbus 320 passes an intersection 920 from left to right (AI: "A320 taxiing on taxiway N from left to right"). The ATC clearance processing module then transmits the decomposed conditions to the image processing module.

The image processing module can use AI technology, such as a vision transformer method and object detection method, to interpret the image from the look-forward camera. In a first step, the image processing module can use a vision transformer method to determine if there is an aircraft on the taxiway (November). Since the look-forward camera is installed and configured to the tilt down angle to cover the nearest taxiway/runway, it eliminates more background information in the look-forward image and allows the vision transformer method to track aircraft on the taxiway. When the vision transformer method detects one aircraft on the taxiway (November), the image processing module can use the object detection method to further detect if there is an aircraft (e.g., Airbus 320).

It is known that each aircraft type has its own characteristics on appearance, such as shape of nose, wings or fuselage, and engine location relative to landing gear and/or wings, etc.; also, the airline logo or name, and aircraft tail number are typically painted on the aircraft fuselage. Such information is widely available on the Internet and can be used to train the object detection algorithm to classify the different parts such as wing, nose, rudder, engine, landing gear, fuselage, etc., for different aircraft types; and also to classify airline logos, airline names, aircraft tail numbers, etc. By integration of the trained model, the object detection algorithm can recognize the target aircraft from the images captured by the look-forward camera based on the characteristics of aircraft.

In the above example of FIG. 9, the object detection algorithm can recognize target aircraft Airbus 320 based on the characteristics of its appearance. Once the object detection algorithm detects the target aircraft, the algorithm will continuously track the target aircraft in the following image frames to check if the target aircraft has passed the intersection by comparing the aircraft location relative to the taxiway in the image. Once the object detection algorithm determines that the target aircraft has passed the taxiway intersection, the image processing module signals the command generation module to start the taxi maneuver.

Alternatively, for above image processing method, the first step and the second step can be swapped. That is, the image processing module can firstly detect if one aircraft (Airbus 320) is in the image by using the object detection algorithm, and secondly determine if the aircraft is on the taxiway (November); and then further track the aircraft and determine if the aircraft has passed the intersection.

During taxi, the image processing module can also adjust the tilt angle of the look-forward camera to cover a far field of view. The image processing module can use a deep mapping method to calculate the distance from the own-ship aircraft to a proceeding aircraft. If the proceeding aircraft is far away from the own-ship aircraft, then the size of the proceeding aircraft in the image is smaller; if the proceeding aircraft is near to the own-ship aircraft, then the size of the proceeding aircraft is larger in the image. The deep mapping method can calculate the distance to the proceeding aircraft by comparing the size change in at least two consecutive frames of the look-forward image.

The look-down camera is mainly used to capture the markings, signs, centerlines, or any other symbols painted on the airport surface. The image processing module can use the object detection algorithm to process the look-down image to determine and/or calculate the destination and/or deviation to a centerline on the surface.

Figures 10A, 10B, 10C:
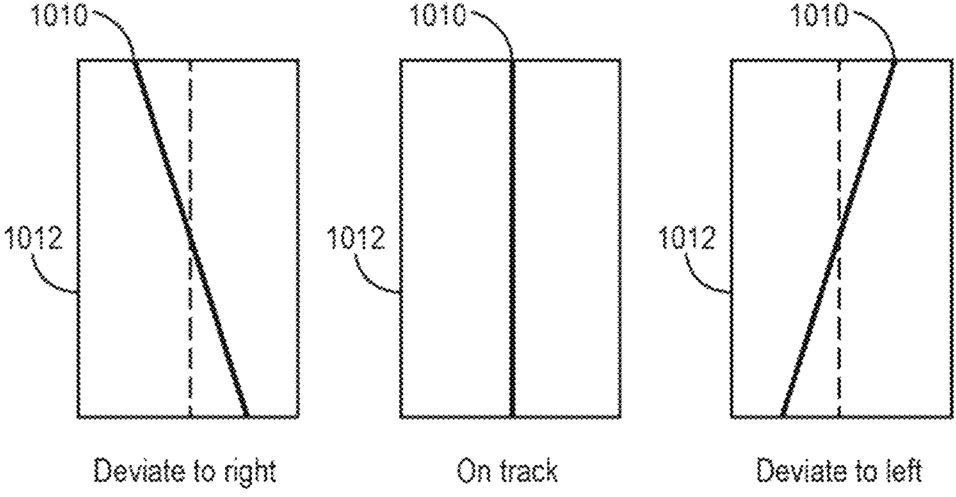
FIGS. 10A-10C are example depictions of images used to determine a deviation of an aircraft with respect to a centerline on a taxiway or runway.

The image processing module can also calculate a deviation with respect to a centerline on a taxiway or runway. As shown in FIGS. 10A-10C, a centerline 1010 (also called a guidance line) is typically painted yellow on an airport surface 1012, which is normally painted a darker color. The image processing module can calculate a deviation based on an angle of inclination of centerline 1010 in an image For example, if centerline 1010 inclines to the left (shown in FIG. 10A), this indicates that the aircraft deviates to the right with respect to centerline 1010; if centerline 1010 does not incline (as shown in FIG. 10B), then the aircraft is on track; if centerline 1010 inclines to the right (as shown in FIG. 10C), this indicates that the aircraft deviates to the left with respect to centerline 1010. The angle of inclination indicates how many degrees the aircraft should adjust the heading direction.

The runway, parking stand, or hold short positions are typically used as destinations in the ATC taxi clearance. In addition, there are unique markings and/or signs for the runway, parking stand, or holding position presented on the airport surface. Thus, the image processing module can use the object detection method to detect the markings and/or signs for the runway, parking stand, and/or hold short positions from the look-down images.

Figure 11:
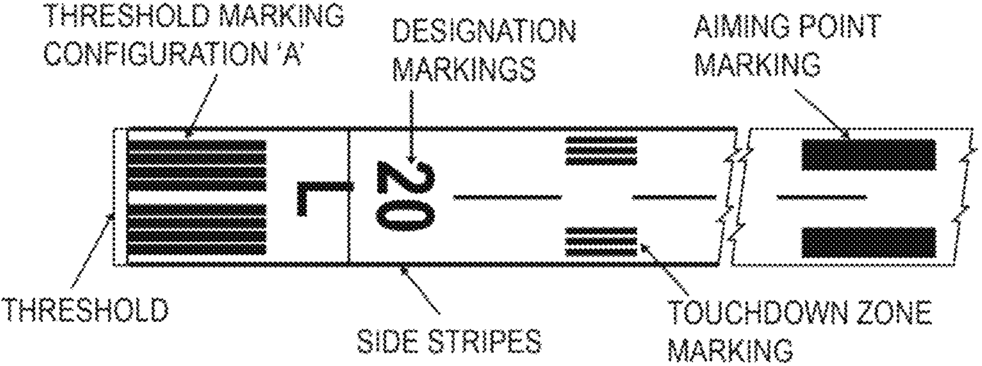
FIG. 11 illustrates an example of typical runway markings at an airport.

FIG. 11 shows one example of typical runway markings at an airport. The designation markings are presented for different types of runways. The runway designator includes a number and/or letter. The letters differentiate between left (L), right (R), or center (C) parallel runways, with both number and letter typically presented in a white color. The holding position markings are painted on runways or taxiways to improve safe and efficient taxi operation on airport surfaces.

Figure 12:
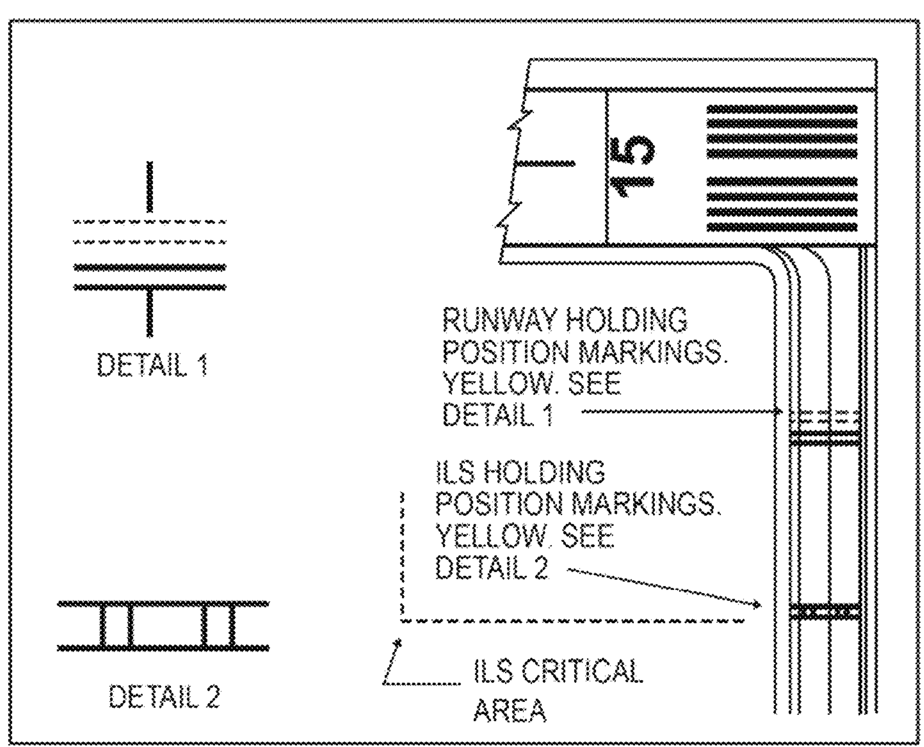
FIG. 12 depicts an example of runway holding position markings on a taxiway at an airport.

The following examples introduce several holding position markings. The Runway Holding Position Markings indicate where an aircraft must stop when approaching a runway. These typically include four yellow lines, with two solid and two dashed lines, which are spaced six or twelve inches apart, and extend across the width of the taxiway or runway. The solid lines are on the side where the aircraft must hold, as shown in FIG. 12, which is an example of runway holding position markings on a taxiway at an airport.

Figure 13:
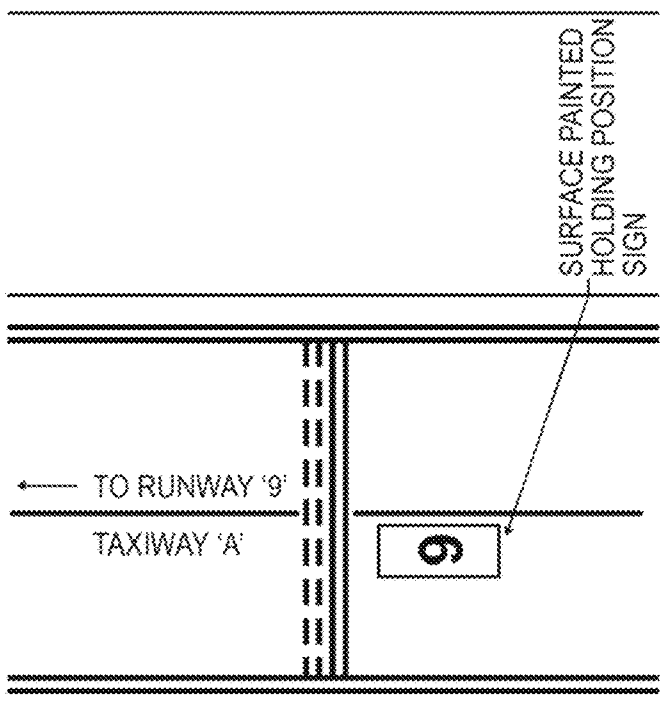
FIG. 13 illustrates an example of surface painted holding position signs on a taxiway at an airport.

FIG. 13 shows an example of surface painted holding position signs on a taxiway at an airport. The surface painted holding position signs typically have a red background with a white inscription and supplement the signs located at the holding position. This type of marking is normally used where the width of the holding position on the taxiway is greater than 200 feet (60 m), and is located to the left side of the taxiway centerline on the holding side and prior to the holding position marking.

Figure 14:
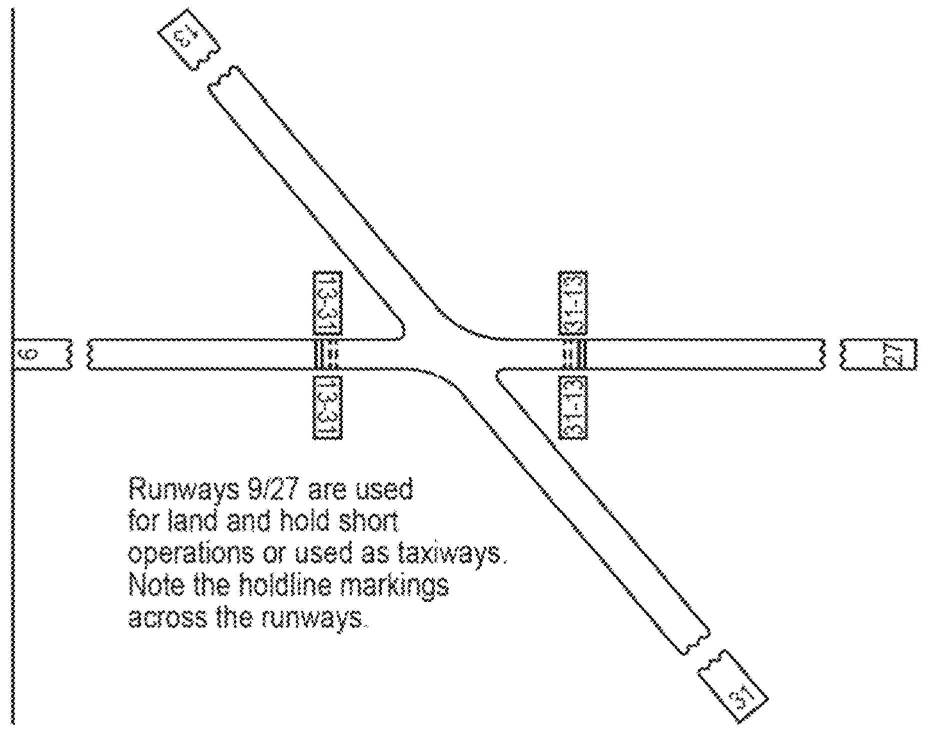
FIG. 14 depicts an example of runway holding position markings on runways at an airport.

FIG. 14 depicts an example of runway holding position markings on runways at an airport. These markings identify the locations on runways where the aircraft must stop. These markings are located on runways used by ATC for land and hold short operations, and taxiing operations. For taxiing operations, a pilot must stop prior to the holding position markings unless explicitly authorized to cross by ATC. A sign with a white inscription on a red background is located adjacent to these holding position markings.

Figure 15:
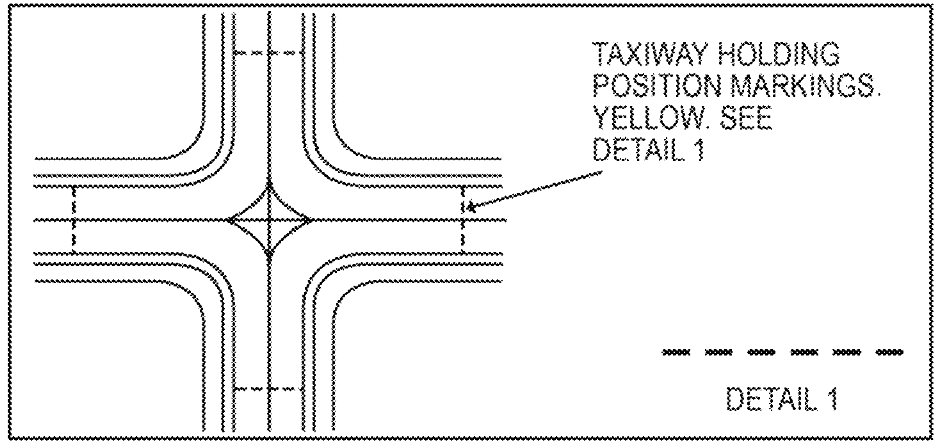
FIG. 15 illustrates an example of holding position markings for intersecting taxiways at an airport.

FIG. 15 shows an example of holding position markings for intersecting taxiways at an airport. The holding position markings for intersecting taxiways include a single dashed line, typically painted in a yellow color, and extending across the width of each taxiway as shown.

Figure 16:
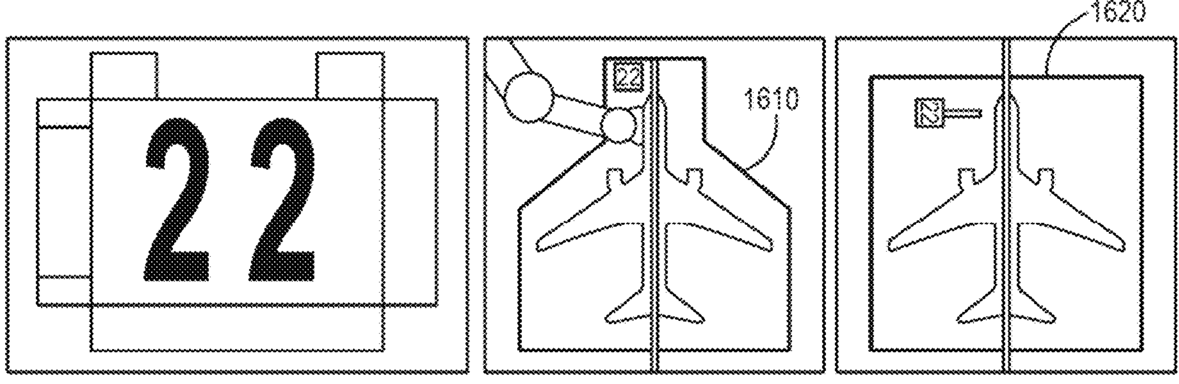
FIG. 16 illustrates an example of parking position designation markings for aircraft at an airport.

FIG. 16 shows examples of parking position designation markings at an airport for aircraft. The parking designator number (e.g., 22) is typically painted in a yellow color with a black background, and parking areas (1610, 1620) are typically outlined by a red line.

The object detection algorithm can be trained by samples of pictures for holding position markings, runway markings, and parking position designation markings in advance. During a taxi operation, the image processing module can apply the object detection algorithm and the trained model to recognize the corresponding holding position markings, runway markings and parking position designation markings presented on the airport surface from images captured by the look-down camera. Aided by the current aircraft position and the airport moving map database, the image processing module can calculate how far the aircraft is apart from the destination such as the holding position, runway, or parking position.

When the aircraft is proximate to the destination of the taxi clearance, the image processing module signals the command generation module to output commands to the control system to slow down the aircraft. Meanwhile, the image processing module requests that the object detection algorithm start to recognize the destination markings such as holding lines, runway markings or parking position markings from the look-down image. For example, the object detection algorithm can calculate the horizontal distance from the aircraft nose to the holding lines based on the holding line location in the image and camera's field of view angle, installation parameters such as height above ground, tilt angle and offset from aircraft nose, and offset from aircraft longitudinal axis, to make sure no part of aircraft goes beyond the hold short line.

Figure 17:
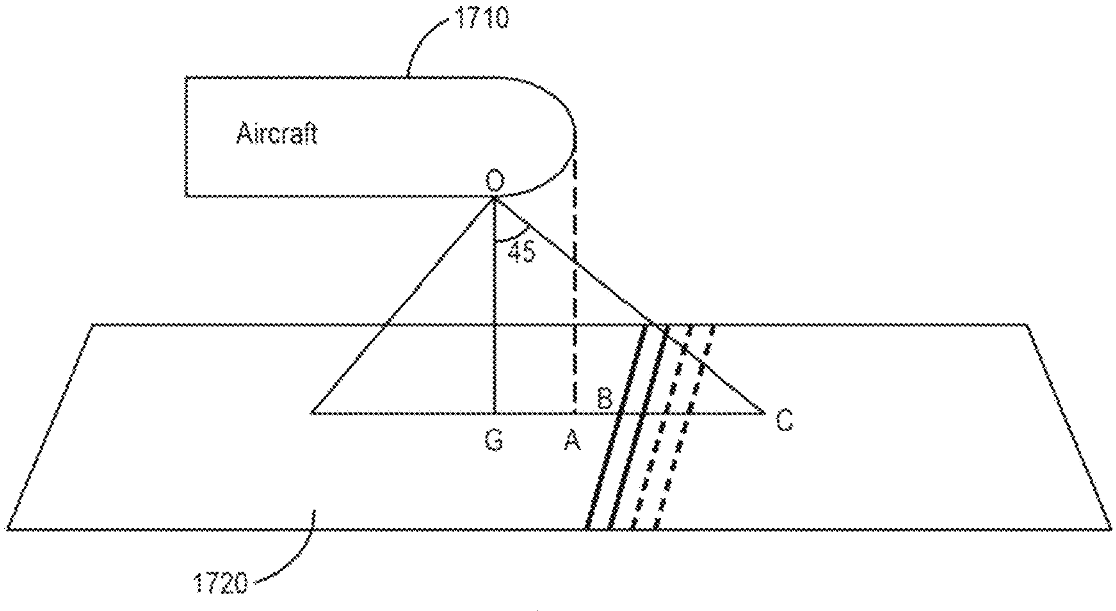
FIG. 17 is a schematic diagram of an example showing how to calculate a distance from an aircraft nose to a holding line.

FIG. 17 is a schematic diagram showing how to calculate a distance from an aircraft nose to a holding line. As shown, an aircraft 1710 has a look-down camera installed at point O on its nose with zero tilt angle, and a point G is the projection of point O on an airport surface 1720. Assuming a field of view of the look-down camera is 90 degrees, the half field of view angle is 45 degrees, as shown in FIG. 17. The line O-G represents the height of the look-down camera installation above ground, and the line O-G is a known value from installation. The line G-C represents a half range of the camera's field of view coverage.

For example, assume line O-G is 10 meters, and based on the triangular geometry, the line GC can be calculated as 10 meters as well. Also, assume a resolution of the installed camera is 1024*768 pixels. That means 512 pixels in the image represents 10 meters (G-C) in reality. The object detection algorithm can further know how much distance each pixel represents. The object detection algorithm can calculate actual distance of G-B based on pixels from the center of the image (represents point G) to point B. The point B represents the location of the holding short line in the image. The line G-A represents the offset from the aircraft nose to the camera installation point, which is a known value. Therefore, if G-A is less than G-B, the processor can know the aircraft is not beyond the holding short line.

Command Generation

The command generation module is operative to generate various commands including: start, stop, turn right XXX degrees, turn left XXX degrees, speed up, slow down, and the like. When there is no condition contained in a taxi clearance and the clearance is validated, the taxi route generation module signals the command generation module to generate a start command. When there is a condition contained in the taxi clearance, the clearance is validated, and the condition is met, the taxi route generation module and image processing module signal the command generation module to generate a start command. When the image processing module detects the aircraft has deviated left to the centerline, the image processing module signals the command generation module to generate a turn right command, with the heading change target being the deviation angle. When the image processing module detects the aircraft has deviated right to the centerline, the image processing module signals the command generation module to generate a turn left command, with the heading change target being the deviation angle.

When the aircraft is approaching its destination, the command generation module generates a slow-down command. When the image processing module calculates and determines the distance from the aircraft to an obstacle, and the aircraft moving direction is less than a safe separation, the image processing module signals the command generation module to generate a slow-down command. When the image processing module determines the aircraft has reached the destination, the image processing module signals the command generation module to generate a stop command.

Readback Generation

As per the ICAO standard for taxi clearance phraseology, a readback message should be organized in a taxi command plus callsign format. For example, if the ATC controller issues a taxi clearance: "UAS one two three, follow Airbus 320 turn right on taxiway November", the readback message should be organized as "follow Airbus 320 turn right on taxiway November, UAS one two three".

The ATC clearance processing module decomposes the taxi clearance into a series of key words including call sign, destination, taxi route segment, etc. The readback generation module uses pre-recorded audio for each key word to generate a readback message from a look up table, such as defined in Table 2 below.

TABLE 2

| Readback Message Look Up Table | |
|---|---|
| Key word 1 | Pre-record audio file_1 |
| Key word 2 | Pre-record audio file_2 |
| . . . | . . . |
| Key word n | Pre-record audio file_n |
| Call sign | Pre-record audio file_callsign |

The processing units and/or other computational devices used in the system and method described herein may be implemented using software, firmware, hardware, or appropriate combinations thereof. The processing units and/or other computational devices may be supplemented by, or incorporated in, specially-designed application-specific integrated circuits (ASICs) or field programmable gate arrays (FPGAs). The processing units and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a system comprising: at least one controller onboard a vehicle and configured to provide for autonomous taxiing of the vehicle at an airport, the at least one controller including a processor and a memory in operative communication with the processor; a set of optical sensors onboard the vehicle and in operative communication with the processor, the optical sensors including at least one look-forward optical sensor and at least one look-down optical sensor; at least one bidirectional communication radio onboard the vehicle and in operative communication with the processor, the at least one bidirectional communication radio operative to receive air traffic control (ATC) clearance information; one or more aiding sensors onboard the vehicle and in operative communication with the processor; and an airport moving map database located in the memory; wherein the processor hosts a plurality of data processing and control modules, comprising: an ATC clearance processing module operative to receive the ATC clearance information from the at least one bidirectional communication radio, the ATC clearance processing module operative to translate the ATC clearance information into processor readable information; an image processing module in operative communication with the ATC clearance processing module and operative to receive image data from the optical sensors, the image processing module configured to provide an object detection function and an image interpretation function; a taxi route generation module in operative communication with the ATC clearance processing module and the airport moving map database, the taxi route generation module operative to receive the translated ATC clearance information from the ATC clearance processing module, and to receive map information from the airport moving map database, to thereby generate a geographic travel route at the airport for the vehicle; an aiding sensor data processing module operative to receive vehicle state data from the one or more aiding sensors, the aiding sensor data processing module operative to determine state information for the vehicle based on the vehicle state data; a command generation module in operative communication with the image processing module, the taxi route generation module, and the aiding sensor data processing module, the command generation module configured to generate commands for driving the vehicle; and a control module in operative communication with the command generation module, the control module operative to automatically drive the vehicle on a surface of the airport, and to control a brake and throttle of the vehicle to adjust a speed of the vehicle.

Example 2 includes the system of Example 1, wherein the processor further hosts a readback generation module in operative communication with the taxi route generation module, the readback generation module operative to generate a response message for transmission to an ATC controller indicating that the processor received and understood the ATC clearance information.

Example 3 includes the system of any of Examples 1-2, wherein the optical sensors include one or more visual light cameras, one or more infrared cameras, or combinations thereof.

Example 4 includes the system of any of Examples 1-3, wherein the at least one bidirectional communication radio comprises a very high frequency (VHF) radio, a high frequency (HF) radio, a satellite communications (SATCOM) radio, or a 4G/5G radio.

Example 5 includes the system of any of Examples 1-4, wherein the one or more aiding sensors comprise a global navigation satellite system (GNSS) receiver, an Inertial Reference System (IRS), an Attitude Heading Reference System (AHRS), or a magnetic heading device.

Example 6 includes the system of any of Examples 1-5, wherein the ATC clearance processing module is configured to host a voice recognition engine, and an interpretation engine in operative communication with the voice recognition engine.

Example 7 includes the system of Example 6, wherein the voice recognition engine is operative to receive and process a voice taxi clearance message, via a voice channel of the at least one bidirectional communication radio; wherein the voice recognition engine is configured to convert the voice taxi clearance message into a transcript clearance message that is sent to the interpretation engine for further processing.

Example 8 includes the system of any of Examples 6-7, wherein the interpretation engine is operative to receive and process a datalink taxi clearance message, or a manually input taxi clearance message; wherein the interpretation engine is configured to output processed clearance information to a taxi route generation engine in the taxi route generation module.

Example 9 includes the system of Example 6, wherein the interpretation engine comprises an artificial intelligence (AI) engine operative to perform natural language processing or regular expression, to understand semantics and extract information from transcript text related to the ATC clearance information.

Example 10 includes the system of any of Examples 1-9, wherein the image processing module is operative to use AI techniques to interpret the image data from the optical sensors.

Example 11 includes the system of Example 10, wherein the image processing module is operative to use an AI algorithm to calculate a distance between the vehicle, which is an own-ship aircraft, and a proceeding aircraft or other obstacle, to keep a safe separation between the vehicle and the proceeding aircraft or other obstacle.

Example 12 includes the system of any of Examples 10-11, wherein the image processing module is operative to calculate a deviation of the vehicle, which is an own-ship aircraft, against a guidance line of a taxiway or runway of the airport.

Example 13 includes the system of any of Examples 10-12, wherein the image processing module is operative to use the AI techniques to determine whether a condition in the ATC clearance information is met.

Example 14 includes the system of any of Examples 1-13, wherein the taxi route generation module is operative to validate whether the ATC clearance information is correct based on the map information from the airport moving map database.

Example 15 includes the system of any of Examples 1-14, wherein the vehicle comprises a crewed aircraft, an uncrewed aircraft, or a ground vehicle.

Example 16 includes a method for autonomous taxiing, the method comprising: receiving a taxi clearance message, from an ATC center, in an ATC clearance processing module onboard a vehicle at an airport; processing the taxi clearance message in the ATC clearance processing module to interpret semantics of the taxi clearance message and extract airport element information; generating a taxi route for the vehicle based on a current position of the vehicle, the airport element information, and map information from an airport moving map database onboard the vehicle; determining, in the ATC clearance processing module, whether the taxi clearance message includes a condition; if the taxi clearance message includes a condition, then the method comprises: (a) capturing an airport environment image by a look-forward optical sensor onboard the vehicle; (b) interpreting the airport environment image in an image processing module to determining if the condition is met; (c) if the condition is not met, repeating the method starting at step (a); (d) if the condition is met, then starting a taxi process; if the taxi clearance message does not include a condition, then starting the taxi process; wherein the taxi process comprises: capturing an airport surface image by a look-down optical sensor onboard the vehicle; determining if the vehicle has arrived at a destination based on the airport surface image; if the vehicle has not arrived at the destination, then the taxi process comprises: identifying any deviation to a centerline of a taxiway or runway on the taxi route; calculating a distance to any obstacles based on the airport environment image; determining one or more commands to be performed by the vehicle; and executing the one or more commands to be performed by the vehicle; if the vehicle has arrived at the destination, then the taxi process comprises: determining one or more commands to be performed by the vehicle; and executing the one or more commands to be performed by the vehicle.

Example 17 includes the method of Example 16, wherein the taxi clearance message from the ATC center is received in a voice format or a text format.

Example 18 includes the method of any of Examples 16-17, wherein the ATC clearance processing module uses AI techniques to determine whether the taxi clearance message includes a condition and whether the condition is met.

Example 19 includes the method of any of Examples 16-18, wherein the one or more commands to be performed by the vehicle comprise: commands to control a drive system of the vehicle to automatically drive the vehicle on a surface of the airport; and commands to control a brake system and a throttle system of the vehicle, to adjust a speed of the vehicle on the surface of the airport.

Example 20 includes the method of any of Examples 16-19, wherein the vehicle comprises a crewed aircraft, an uncrewed aircraft, or a ground vehicle.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system comprising:

at least one controller onboard a vehicle and configured to provide for autonomous taxiing of the vehicle at an airport, the at least one controller including a processor and a memory in operative communication with the processor;

a set of optical sensors onboard the vehicle and in operative communication with the processor, the optical sensors including at least one look-forward optical sensor and at least one look-down optical sensor;

at least one bidirectional communication radio onboard the vehicle and in operative communication with the processor, the at least one bidirectional communication radio operative to receive air traffic control (ATC) clearance information;

one or more aiding sensors onboard the vehicle and in operative communication with the processor; and an airport moving map database located in the memory;

wherein the processor hosts a plurality of data processing and control modules, comprising:

an ATC clearance processing module operative to receive the ATC clearance information from the at least one bidirectional communication radio, the ATC clearance processing module operative to translate the ATC clearance information into processor readable information;

an image processing module in operative communication with the ATC clearance processing module and operative to receive image data from the optical sensors, the image processing module configured to provide an object detection function and an image interpretation function;

wherein the image processing module is operative to execute an artificial intelligence (AI) algorithm to calculate a distance between the vehicle and a proceeding aircraft or other object, by performing a deep mapping method, which calculates the distance between the proceeding aircraft or other object by comparing a size change in at least two consecutive frames of a look-forward image;

a taxi route generation module in operative communication with the ATC clearance processing module and the airport moving map database, the taxi route generation module operative to receive the translated ATC clearance information from the ATC clearance processing module, and to receive map information from the airport moving map database, to thereby generate a geographic travel route at the airport for the vehicle;

an aiding sensor data processing module operative to receive vehicle state data from the one or more aiding sensors, the aiding sensor data processing module operative to determine state information for the vehicle based on the vehicle state data;

a command generation module in operative communication with the image processing module, the taxi route generation module, and the aiding sensor data processing module, the command generation module configured to generate commands for driving the vehicle; and a control module in operative communication with the command generation module, the control module operative to automatically drive the vehicle on a surface of the airport, and to control a brake and throttle of the vehicle to adjust a speed of the vehicle.

2. The system of claim 1, wherein the processor further hosts a readback generation module in operative communication with the taxi route generation module, the readback generation module operative to generate a response message for transmission to an ATC controller indicating that the processor received and understood the ATC clearance information.

3. The system of claim 1, wherein the optical sensors include one or more visual light cameras, one or more infrared cameras, or combinations thereof.

4. The system of claim 1, wherein the at least one bidirectional communication radio comprises a very high frequency (VHF) radio, a high frequency (HF) radio, a satellite communications (SATCOM) radio, or a 4G/5G radio.

5. The system of claim 1, wherein the one or more aiding sensors comprise a global navigation satellite system (GNSS) receiver, an Inertial Reference System (IRS), an Attitude Heading Reference System (AHRS), or a magnetic heading device.

6. The system of claim 1, wherein the ATC clearance processing module is configured to host a voice recognition engine, and an interpretation engine in operative communication with the voice recognition engine.

7. The system of claim 6, wherein the voice recognition engine is operative to receive and process a voice taxi clearance message, via a voice channel of the at least one bidirectional communication radio;

wherein the voice recognition engine is configured to convert the voice taxi clearance message into a transcript clearance message that is sent to the interpretation engine for further processing.

8. The system of claim 6, wherein the interpretation engine is operative to receive and process a datalink taxi clearance message, or a manually input taxi clearance message;

wherein the interpretation engine is configured to output processed clearance information to a taxi route generation engine in the taxi route generation module.

9. The system of claim 6, wherein the interpretation engine comprises an artificial intelligence (AI) engine operative to perform natural language processing or regular expression, to understand semantics and extract information from transcript text related to the ATC clearance information.

10. The system of claim 1, wherein the image processing module is operative to use AI techniques to interpret the image data from the optical sensors.

11. The system of claim 10, wherein the image processing module is operative to use the AI algorithm to calculate the distance between the vehicle, which is an own-ship aircraft, and the proceeding aircraft or other obstacle, to keep a safe separation between the vehicle and the proceeding aircraft or other obstacle.

12. The system of claim 10, wherein the image processing module is operative to calculate a deviation of the vehicle, which is an own-ship aircraft, against a guidance line of a taxiway or runway of the airport, wherein the deviation is calculated based on an angle of inclination of the guidance line in an image.

13. The system of claim 10, wherein the image processing module is operative to use the AI techniques to determine whether a condition in the ATC clearance information is met.

14. The system of claim 1, wherein the taxi route generation module is operative to validate whether the ATC clearance information is correct based on the map information from the airport moving map database.

15. The system of claim 1, wherein the vehicle comprises a crewed aircraft, an uncrewed aircraft, or a ground vehicle.

16. A method for autonomous taxiing, the method comprising:

receiving a taxi clearance message, from an air traffic control (ATC) center, in an ATC clearance processing module onboard a vehicle at an airport;

processing the taxi clearance message in the ATC clearance processing module to interpret semantics of the taxi clearance message and extract airport element information;

generating a taxi route for the vehicle based on a current position of the vehicle, the airport element information, and map information from an airport moving map database onboard the vehicle;

determining, in the ATC clearance processing module, whether the taxi clearance message includes a condition;

if the taxi clearance message includes a condition, then the method comprises:

(a) capturing an airport environment image by a look-forward optical sensor onboard the vehicle;

(b) interpreting the airport environment image in an image processing module to determining if the condition is met;

(c) if the condition is not met, repeating the method starting at step (a);

(d) if the condition is met, then starting a taxi process;

if the taxi clearance message does not include a condition, then starting the taxi process;

wherein the taxi process comprises:

capturing an airport surface image by a look-down optical sensor onboard the vehicle;

determining if the vehicle has arrived at a destination based on the airport surface image;

if the vehicle has not arrived at the destination, then the taxi process comprises:

identifying any deviation to a centerline of a taxiway or runway on the taxi route;

calculating a distance to any obstacles based on the airport environment image;

determining one or more commands to be performed by the vehicle; and executing the one or more commands to be performed by the vehicle;

if the vehicle has arrived at the destination, then the taxi process comprises:

determining one or more commands to be performed by the vehicle; and executing the one or more commands to be performed by the vehicle.

17. The method of claim 16, wherein the taxi clearance message from the ATC center is received in a voice format or a text format.

18. The method of claim 16, wherein the ATC clearance processing module uses artificial intelligence (AI) techniques to determine whether the taxi clearance message includes a condition and whether the condition is met.

19. The method of claim 16, wherein the one or more commands to be performed by the vehicle comprise:

commands to control a drive system of the vehicle to automatically drive the vehicle on a surface of the airport; and commands to control a brake system and a throttle system of the vehicle, to adjust a speed of the vehicle on the surface of the airport.

20. The method of claim 16, wherein the vehicle comprises a crewed aircraft, an uncrewed aircraft, or a ground vehicle.

* * * * *